US010042681B2

(12) United States Patent
Lai et al.

(10) Patent No.: US 10,042,681 B2
(45) Date of Patent: Aug. 7, 2018

(54) SYSTEMS AND METHODS FOR MANAGING NAVIGATION AMONG APPLICATIONS

(71) Applicant: Google Technology Holdings LLC, Mountain View, CA (US)

(72) Inventors: Rui Lai, Beijing (CN); Wen-Guang Tian, Beijing (CN); Xin-Yi Xiao, Beijing (CN)

(73) Assignee: Google Technology Holdings LLC, Mountain View, CA (US)

( * ) Notice: Subject to any disclaimer, the term of this patent is extended or adjusted under 35 U.S.C. 154(b) by 341 days.

(21) Appl. No.: 14/764,064

(22) PCT Filed: Jan. 30, 2013

(86) PCT No.: PCT/CN2013/071154
§ 371 (c)(1),
(2) Date: Jul. 28, 2015

(87) PCT Pub. No.: WO2014/117345
PCT Pub. Date: Aug. 7, 2014

(65) Prior Publication Data
US 2015/0370620 A1   Dec. 24, 2015

(51) Int. Cl.
*G06F 3/0484* (2013.01)
*G06F 9/54* (2006.01)
(Continued)

(52) U.S. Cl.
CPC .......... *G06F 9/543* (2013.01); *G06F 3/04842* (2013.01); *G06F 9/445* (2013.01); *G06F 9/451* (2018.02)

(58) Field of Classification Search
CPC ........ G06F 9/445; G06F 9/4443; G06F 9/543; G06F 3/04842
See application file for complete search history.

(56) References Cited

U.S. PATENT DOCUMENTS 5,694,563 A   12/1997  Belfiore et al.
6,240,430 B1   5/2001  Deike et al.
(Continued)

FOREIGN PATENT DOCUMENTS

EP   0786724 A1   7/1997
WO   2014117345 A1   8/2014

OTHER PUBLICATIONS

Extended Search Report from counterpart European Application No. 13873505.5, dated Jul. 19, 2016, 7 pp.
(Continued)

*Primary Examiner* — Nicholas Klicos
(74) *Attorney, Agent, or Firm* — Shumaker & Sieffert, P.A.

(57) ABSTRACT

Systems and methods are provided for managing navigation among applications installed on an electronic device. According to certain aspects, an electronic device receives (1502) a selection of a graphical item displayed by a source application and an instruction to copy the graphical item. The electronic device stores (1514) an identification of the source application in a data record and navigates (1522) to a destination application. Further, the electronic device receives (1538) a command to paste the graphical item within the destination application and return to the source application, examines (1560) the data record to identify the source application, and automatically navigates (1570) to the source application.

15 Claims, 17 Drawing Sheets

(51) Int. Cl.
*G06F 9/445* (2018.01)
*G06F 9/451* (2018.01)

(56) References Cited

U.S. PATENT DOCUMENTS

| | | | |
|---|---|---|---|
| 8,020,101 B2 | 9/2011 | Kesavarapu | |
| 2004/0070622 A1* | 4/2004 | Cossey | G06F 9/543 |
| | | | 715/769 |
| 2005/0102629 A1* | 5/2005 | Chen | G06F 3/0481 |
| | | | 715/770 |
| 2005/0154994 A1* | 7/2005 | Chen | G06F 9/543 |
| | | | 715/770 |
| 2010/0058176 A1 | 3/2010 | Carro et al. | |
| 2011/0161880 A1* | 6/2011 | Abbott | G06F 3/04842 |
| | | | 715/823 |
| 2012/0246573 A1* | 9/2012 | Arokiaswamy | G06F 17/24 |
| | | | 715/748 |
| 2014/0157168 A1* | 6/2014 | Albouyeh | G06F 3/0484 |
| | | | 715/770 |
| 2015/0046800 A1* | 2/2015 | Isidore | G06F 17/24 |
| | | | 715/255 |

OTHER PUBLICATIONS

International Search Report and Written Opinion of International Application No. PCT/CN2013/071154, dated Oct. 31, 2013, 11 pp.
First Office Action, and translation thereof, from counterpart Chinese Application No. 201380071883.9, dated Dec. 7, 2017, 16 pp.

* cited by examiner

SYSTEMS AND METHODS FOR MANAGING NAVIGATION AMONG APPLICATIONS

FIELD

This patent application generally relates to managing the navigation among software applications installed on an electronic device. In particular, the patent application relates to platforms and techniques for enabling users of electronic devices to effectively and efficiently copy text from and paste text into various software applications of the electronic devices.

BACKGROUND

Various electronic devices support the installation and execution of software applications configured to perform various functions. For example, the applications can be social networking applications, personalization applications, imaging applications, utility applications, productivity applications, browser applications, games, and/or other types of software applications. Further, various existing distribution platforms, such as the Google Play platform from Google Inc., enable users to download and install applications to electronic devices. With the increasing amount of available applications and the improvement of the operating systems, users can find themselves concurrently executing multiple applications or otherwise utilizing multiple applications during operation of the electronic devices. For example, some operating systems support multitasking whereby users can switch among various applications without having to close and re-launch the applications. Further, various operating systems support copy and paste functionality whereby users can copy certain graphical items and paste the copied graphical items into a desired application interface.

In particular, users wishing to copy a graphical item from one application and paste the copied graphical item into a different application must explicitly copy the graphical item in one application, manually navigate to a second application, and paste the graphical item into the second application. Manual navigation may include the ALT+TAB sequence of Microsoft Windows, use of a task manager to switch to a particular software application, or navigation to and selection of a software application using a mouse, touchscreen, touchpad, or the like. Accordingly, there is an opportunity to enable users of electronic devices to effectively and efficiently navigate between and among applications during copy and paste operation.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

DETAILED DESCRIPTION

Figure 1:
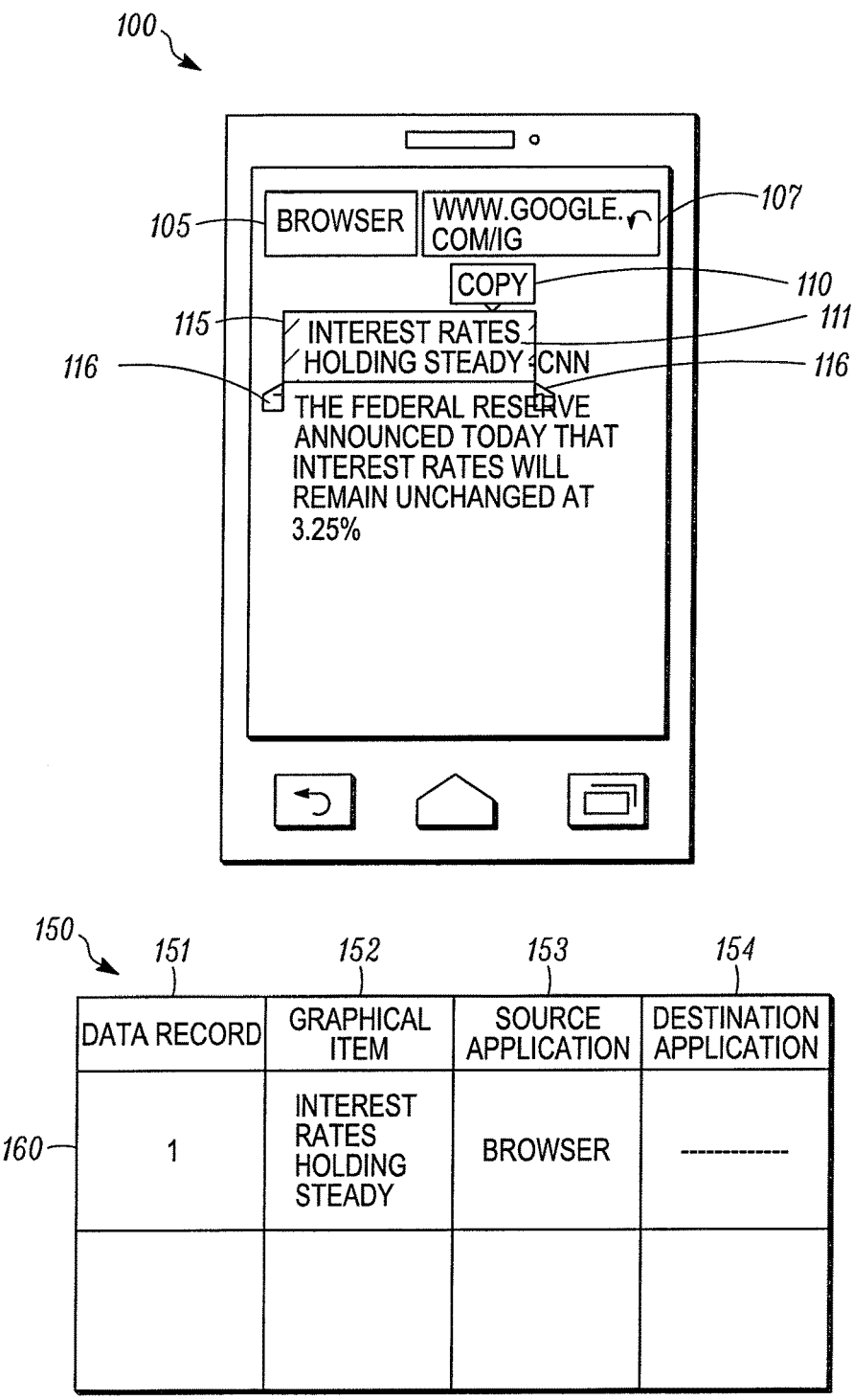
FIGS. 1-8 depict example interfaces associated with navigating among applications in accordance with some embodiments.

Systems and methods enable an electronic device to efficiently and effectively navigate among software applications installed on the electronic device via one or more selections associated with copy and paste operations. According to embodiments, the electronic device can create and update a data structure that stores identifications of applications from which graphical items are copied and into which the graphical items are pasted. The electronic device can present an option to the user that, upon selection, instructs the electronic device to paste a previously-copied graphical item into a certain application and then automatically navigate to a different application from which the graphical item was originally copied. Further, the electronic device can present a similar option to the user that, upon selection, instructs the electronic device to copy a graphical item from a certain application and then automatically navigate to a different application into which a prior graphical item was previously pasted.

According to embodiments, the data structure has one or more data records can each include a graphical item that was copied, an identification of a source application from which the graphical item was copied, and an identification of a destination application into which the graphical item was pasted. In certain aspects, the identification of the destination application can be a part of a list that includes additional identifications of additional applications into which the same or additional graphical items have been pasted. For example, if a user selects to copy text from a browser application, and selects to paste the copied text into a notes application and a messages application, the data structure can update a list to identify the notes and messages applications as destination applications into which text has been pasted. In embodiments, if a user selects to copy a new graphical item, the electronic device can replace a previously-copied graphical item in a data structure with the new graphical item as well as an identification of the source application from which the graphical item is copied. Further, when the user selects to paste a graphical item into a destination application, the electronic device can update the destination field of the data structure to reflect an identification of the destination application.

The systems and methods offer a benefit to users by enabling users to efficiently and effectively navigate among applications associated with copy and/or paste events. Instead of users having to manually navigate among applications using additional keystrokes or cursor movements, the systems and methods present the users with options to automatically navigate among desired applications in response to copying and/or pasting graphical items. This increases the ease of operation of the electronic devices and reduces the amount of time needed to navigate among applications. Further, the systems and methods present users with conventional options to copy and paste graphical items without the automatic navigation functionalities in cases in which the user does not want to automatically navigate to applications associated with previous copy and paste events.

It should be appreciated that a "graphical item" as used herein can be any content that is selectable for copying from and pasting into various interfaces associated with applications. For example, a graphical item can be text, an icon, a graphic, a snippet, a fragment, and/or any other textual or multimedia content. Further, although the systems and methods are described with respect to copying functionality, it should be appreciated that the systems and methods may be similarly implemented with a "cut" functionality, whereby the electronic devices can copy a selected graphical item from an application interface as well as remove the selected graphical item from the application interface. Accordingly, as used herein, a "copy" function can also occur as part of a "cut" function.

FIGS. 1-14 depict example interfaces of electronic devices that illustrate the systems and methods as described herein. According to embodiments, each of the example interfaces is associated with an application installed on an electronic device. It should be appreciated that the interfaces are merely examples of various sequences of operations and can include and/or exclude other components, elements, and options, as well as other various combinations and sequences of components, elements, and options. Further, it should be appreciated that the example interfaces can be a part of a user interface capable of receiving inputs, commands, instructions, and the like from a user of the electronic device. According to embodiments, the user can select various graphical items within the interfaces according to various techniques, including via various touchscreen gestures, mouse interactions, touchpad contacts, keyboard inputs, stylus interactions, voice commands, input from peripheral I/O components, and others.

FIGS. 1-14 further depict example data structures that correspond to the depicted selections of and interactions with the associated interfaces. In particular, the data structures of FIGS. 1-14 depict updates (e.g., writes, reads, overwrites, replacements, etc.) according to the selections of and interactions with the associated interfaces. In embodiments, the example data structures are associated with a clipboard manager method that can be implemented with an operating system of the electronic device. It should be appreciated that the example data structures are merely examples and can include and/or exclude other records, data fields, data, and structures, as well as other various combinations of records, data fields, data, and structures.

Referring to FIG. 1, the electronic device can display a graphical user interface 100 that enables a user to copy text displayed within a browser application. In the depictions of FIGS. 1-8, the graphical user interfaces are embodied within a smartphone. As shown in FIG. 1, the interface 100 can include an application icon or other indication 105 that identifies the application (as shown: "Browser") and an address bar 107 that can display a current uniform resource locator (URL) and can accept a user input of a URL to which the electronic device can navigate. If there are separate instantiations of a browser such as multiple browser tabs (and/or multiple browser programs), each browser instantiation may be separately identified.

The interface 100 can enable the user to select a graphical item 115 displayed within the interface 100. In certain embodiments as shown in FIG. 1, the interface 100 can include selectors 116 that the user can select and interact with to adjust a selection region corresponding to the selected graphical item 115. It should be appreciated that the user can adjust the selection region according to various techniques. In response to the user selecting the graphical item 115, the electronic device can display a copy option 110 that is selectable by the user. As shown in FIG. 1, the electronic device can indicate the selected graphical item 115 and can display the copy option 110 in response to sensing a "touch and hold" event 111 initiated by the user. In implementations, the electronic device can sense the touch and hold event 111 by sensing a contact with the interface 100 for a certain amount of time. It should be appreciated that the electronic device can display the copy option 110 in response to other sensed events, triggers, selections, or interactions such as stylus control, key sequences, mouse control, or voice commands.

FIG. 1 also depicts a data structure 150 that corresponds to the selections of and interactions with the graphical user interface 100. The data structure 150 can include a data record index field 151, a graphical item field 152, a sourceID field 153, and a destinationID field 154. According to embodiments, the electronic device can copy the graphical item 115 into a first data record 160 in response to the user selecting the copy option 110. More particularly, the electronic device can write the graphical item 115 as well as an identification of the browser application to the data record "1" 160 in data structure 150. As shown in FIG. 1, the electronic device can write the graphical item 115 ("Interest Rates Holding Steady") to the graphical item field 152 and the application identification ("Browser") to the sourceID field 153. After the user selects the copy option 110, the user can navigate the electronic device to a second application, for example by manually launching the second application using an icon or shortcut selection or focusing on an already-open application through through menu system navigation, an icon or tab selection, a task manager, or an ALT+TAB sequence.

Figure 2:
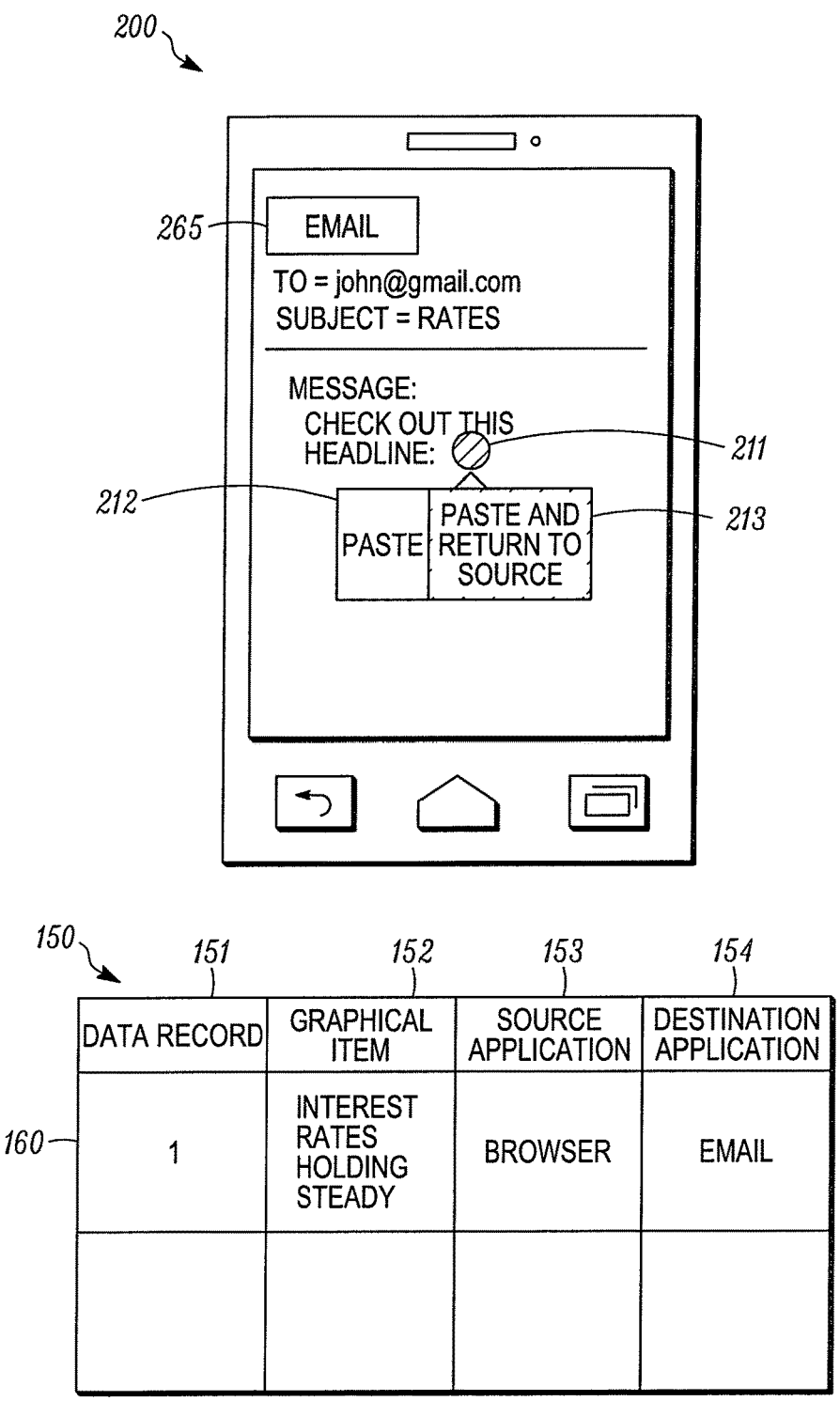

Referring to FIG. 2, the user navigates to an email application (as indicated by an application indication 205) and the electronic device can display an appropriate graphical user interface 200. The interface 200 as shown in FIG. 2 includes content that is commonly included in an email application such as an example draft email including a recipient, a subject, and the email message itself. According to embodiments, the user of the electronic device can select to paste the graphical item 115 that the electronic device copied from the browser application as depicted in FIG. 1. More particularly as shown in FIG. 2, the electronic device can sense a touch and hold event 211 initiated by the user. According to embodiments, the electronic device can display a paste option 212 and a paste and return option 213 in response to detecting the touch and hold event 211. It should be appreciated that the electronic device can display the paste option 212 and the paste and return option 213 in response to other triggers, events, interactions, and/or the like.

According to embodiments, if the user selects the paste option 212, the electronic device can paste the graphical item 115 ("Interest Rates Holding Steady") that the electronic device copied from the interface 100. In particular, the electronic device can access the data structure 150 to read the graphical item field 152 (which stores a copy of the graphical item 115) and can add the graphical item 115 to the interface 200 at or near the location of the touch and hold event 211. If the user selects the paste and return option 213, the electronic device can paste the copied graphical item 115 and automatically navigate to the browser application as depicted in FIG. 1. In particular, the electronic device can access the data structure 150 to read the graphical item field (which stores a copy of the graphical item 115) and read the sourceID field 153 (which stores the identification of the browser application instantiation). Further, the electronic device can add the graphical item 115 to the interface 200 at or near the location of the touch and hold event 211, and can automatically navigate to the browser application in accordance with the identification of the browser application from the sourceID field 153. Responsive to the user selecting either the paste option 212 or the paste and return option 213, the electronic device can write an identification of the email application ("Email") to the destinationID field 154 of the data record "1" 160 in the data structure 150. For purposes of explanation, the user selects the paste and return option 213 in this example sequence.

Figure 3:
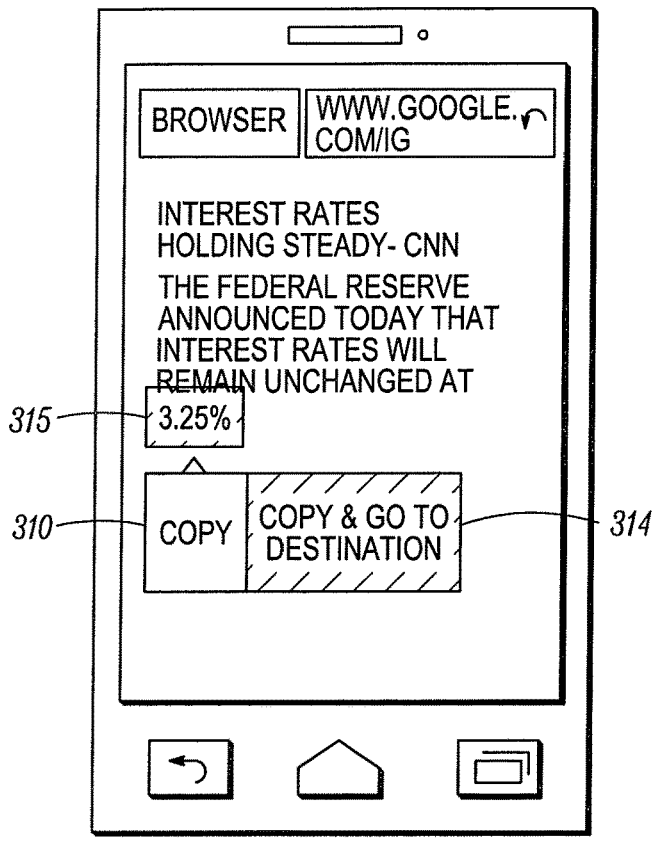

Referring to FIG. 3, the electronic device automatically navigates to the browser application and display an interface 300 that corresponds to the browser application after the user selects the paste and return option 213 in FIG. 2. As shown in FIG. 3, the electronic device can detect or sense a user selecting another graphical item 315 ("3.25%") (such as via a touch and hold event). According to embodiments, the electronic device can display a copy option 310 and a copy and go to destination option 314 in response to detecting the user selection.

If the user selects either the copy option 310 or the copy and go to destination option 314, the electronic device can create a new data entry or record 360 within the data structure 150, and the device writes the graphical item 315 to the graphical item field 152 and an identification of the source application ("Browser") to the sourceID field 153 of the new record 360. Further, if the user selects the copy and go to destination option 314, the electronic device can examine the data structure 150 to determine an appropriate destination application to which to navigate. As shown in FIG. 3, the electronic device can read the destinationID field 154 identifier 370 to identify the email application as the appropriate destination application. More particularly, in the embodiment as shown in FIG. 3, the electronic device reads the previous data record "1" 160 to identify the email application, as the destinationID field for data record "2" 360 is null.

In some embodiments, the electronic device can review multiple previous data records and select, as the destination application, a most frequent destination application from the multiple destinationID fields. For example, if there are four previous data records, and three of the data records have an email application as the destinationID and one of the data records has a notes application as the destination ID, the electronic device can select the email application as the destination application. It should be appreciated that the electronic device can review any or all previous data records to select the destination application.

Figure 4:
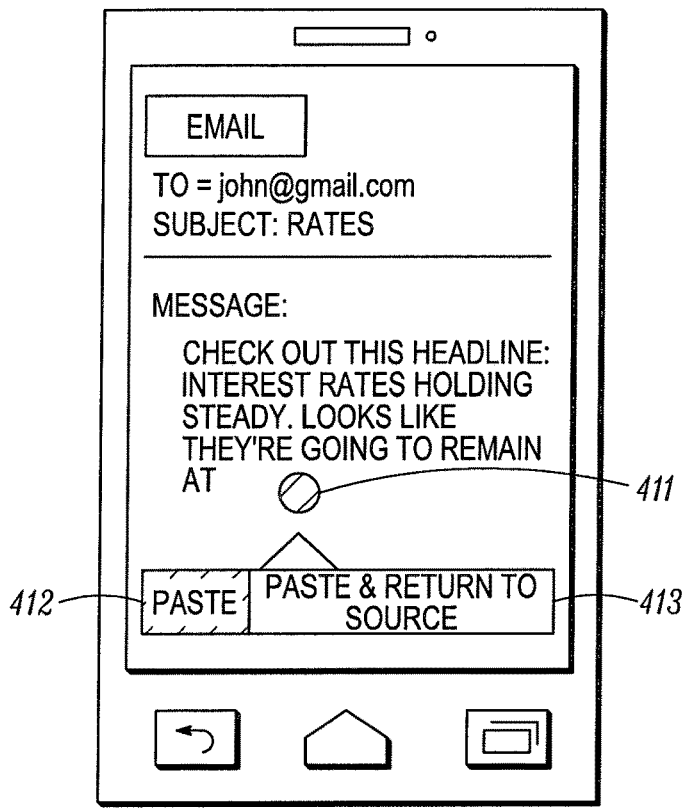

For purposes of explanation, the user selects the copy and go to destination option 314 in this example sequence. Accordingly, as shown in FIG. 4, the electronic device automatically navigates to the email application and displays a corresponding graphical user interface 400. The electronic device can sense a touch and hold event 411 initiated by the user. According to embodiments, the electronic device can display a paste option 412 and a paste and return option 413 in response to detecting the touch and hold event 411. According to embodiments, if the user selects the paste option 412, the electronic device can paste the graphical item 315 ("3.25%") that was copied from the interface 300. In particular, the electronic device can access the data structure 150 to read the graphical item field 152 (which stores a copy of the graphical item 315) and can add the graphical item 315 to the interface 400 at or near the location of the touch and hold event 411. Although not shown in FIG. 4, it should be appreciated that the electronic device can write an identification of the email application (e.g., "Email") to the destinationID field 154 of data record "2" 360 in response to the user selecting the paste option 412.

Figure 5:
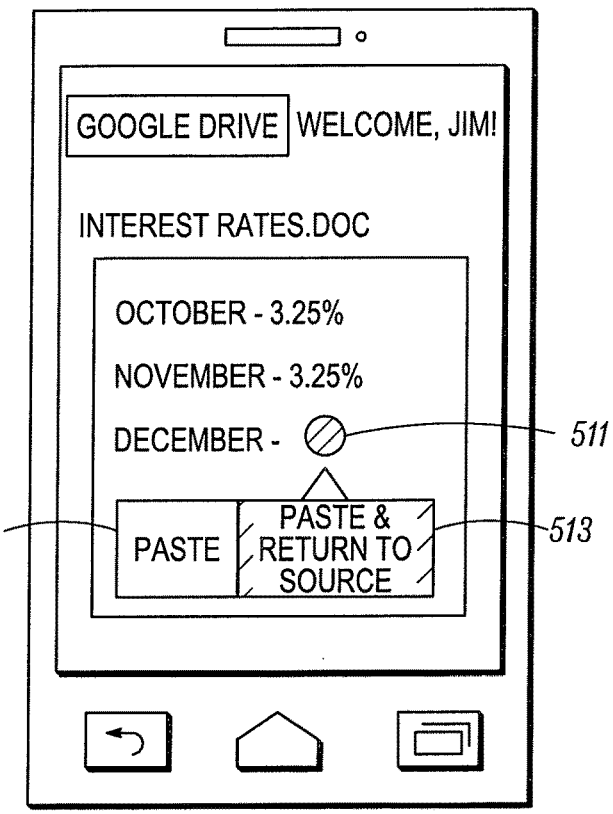

For purposes of explanation, the user selects the paste option 412 and then manually navigates to a different application in this example sequence. For example, the user can navigate to the Google Drive application. As shown in FIG. 5, the electronic device can display a graphical user interface 500 for the Google Drive application. The electronic device can sense a touch and hold event 511 initiated by the user. According to embodiments, the electronic device can display a paste option 512 and a paste and return option 513 in response to detecting the touch and hold event 511. For purposes of explanation, the user selects the paste and return option 513 in this example sequence.

According to embodiments, when the user selects the paste and return option 513, the electronic device can paste the graphical item 315 ("3.25%") and automatically navigate to the browser application. In particular, the electronic device can access the data structure 150 to read the graphical item field 152 (which stores a copy of the graphical item 315), read the sourceID field 153 (which stores the identification of the browser application), and write an identification of the destination application ("Google Drive") to the destinationID field 154 of data record "2" 360 of the data structure 150. Further, the electronic device can add the graphical item 315 to the interface 500 at or near the location of the touch and hold event 511, and can automatically navigate to the browser application in accordance with the identification of the browser application from the sourceID field 153 of the current data record 360.

Figure 6:
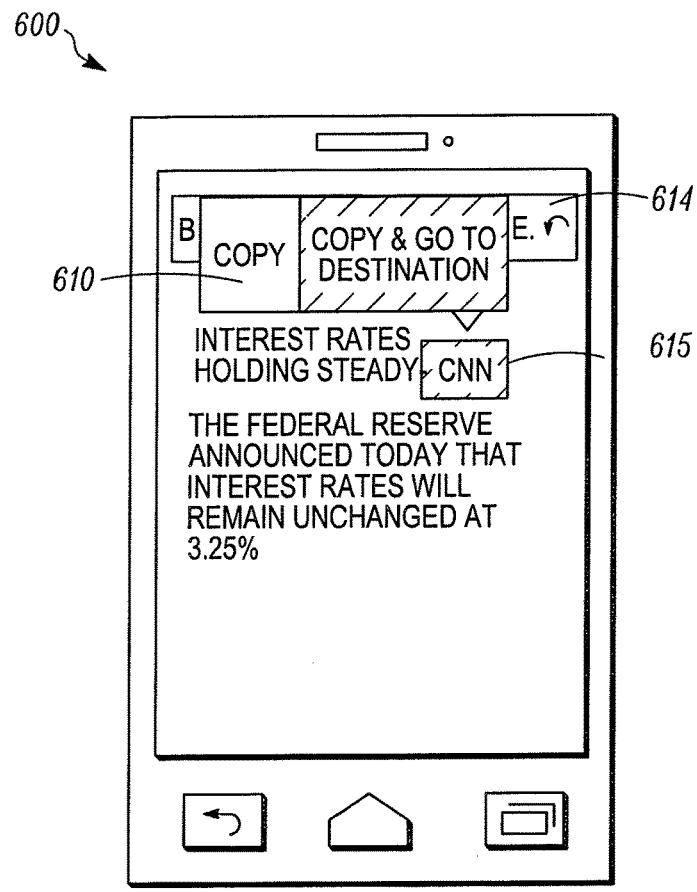

Referring to FIG. 6, the electronic device can automatically navigate to the browser application and display a corresponding interface 600 of the browser application. As shown in FIG. 6, the electronic device can detect or sense a user selecting a graphical item 615 ("CNN") (such as via a touch and hold event). According to embodiments, the electronic device can display a copy option 610 and a copy and go to destination option 614 in response to detecting the user selection. For purposes of explanation, the user selects the copy and go to destination option 614 in this example sequence.

In response to detecting that the user selects the copy and go to destination 614 option, the electronic device can create a new data entry or record 660 within the data structure 150, and write the graphical item 615 to the graphical item field 152 and an identification of the source application ("Browser") to the sourceID field 153 of the new record 660. Further, the electronic device can examine the data structure 150 to determine an appropriate destination application in response to the copy and go to destination 614 command. As shown in FIG. 6, the electronic device can read the destinationID field 154 identifier 670 to identify the Google Drive application as the appropriate destination application. More particularly, in the embodiment as shown in FIG. 6, the electronic device reads the previous data record "2" 360 to identify the Google Drive application, because the destinationID field 154 for data record "3" 660 is null.

Figure 7:
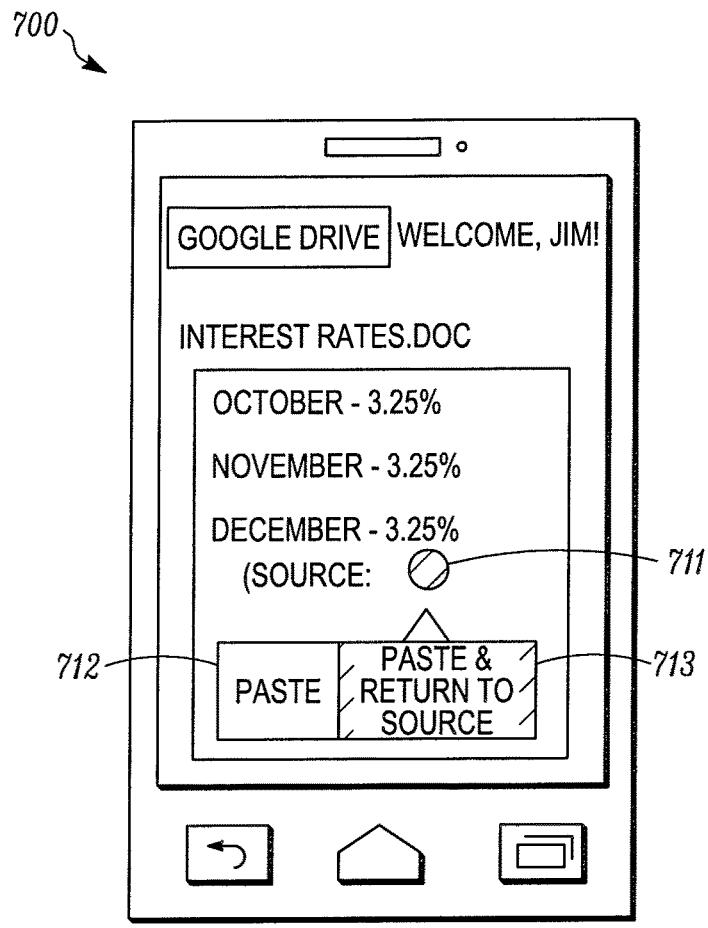

In response to the detecting that the user has selected the copy and go to destination option 614, the electronic device can automatically navigate to the Google Drive application and display a corresponding interface 700 as shown in FIG. 7. The electronic device can sense a touch and hold event 711 initiated by the user. According to embodiments, the electronic device can display a paste option 712 and a paste and return option 713 in response to detecting the touch and hold event 711. For purposes of explanation, the user selects the paste and return option 713 in this example sequence.

According to embodiments, when the user selects the paste and return option 713, the electronic device can paste the graphical item 615 ("CNN") from the current record 660 and navigate to the browser application. In particular, the electronic device can access the data structure 150 to read the graphical item field 152 (which stores the graphical item 615), read the sourceID field 153 (which stores the identification of the browser application), and write an identification of the application ("Google Drive") to the destinationID field 154 of data record "3" 660 of the data structure 150. Further, the electronic device can add the graphical item 615 ("CNN" to the interface 700 at or near the location of the touch and hold event 711 and can automatically navigate to the browser application in accordance with the identification of the browser application from the sourceID field 153 of the current data record 660.

Figure 8:
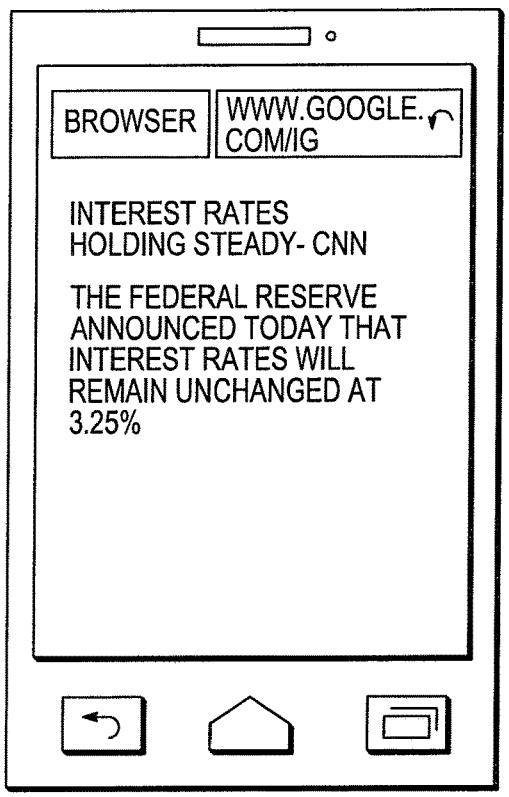

Referring to FIG. 8, the electronic device can automatically navigate to the browser application and display a corresponding interface 800 of the browser application. FIG. 8 also includes the data structure 150 with data records 160, 360, 660 having fields 151, 152, 153, 154 populated based on the selections and interactions as discussed with respect to FIGS. 1-7.

FIGS. 9-14 depict another series of example graphical user interfaces that can be displayed by an electronic device and that depict various functionalities of the systems and methods. Further, FIGS. 9-14 depict an alternate data structure that corresponds to the selections and interactions of the example interfaces. According to embodiments, the data structure of FIGS. 9-14 includes a singular record or entry, whereby the electronic device can overwrite certain fields of the single data record in lieu of creating new data entries or records within a multi-record data structure per FIGS. 1-8.

Figure 9:
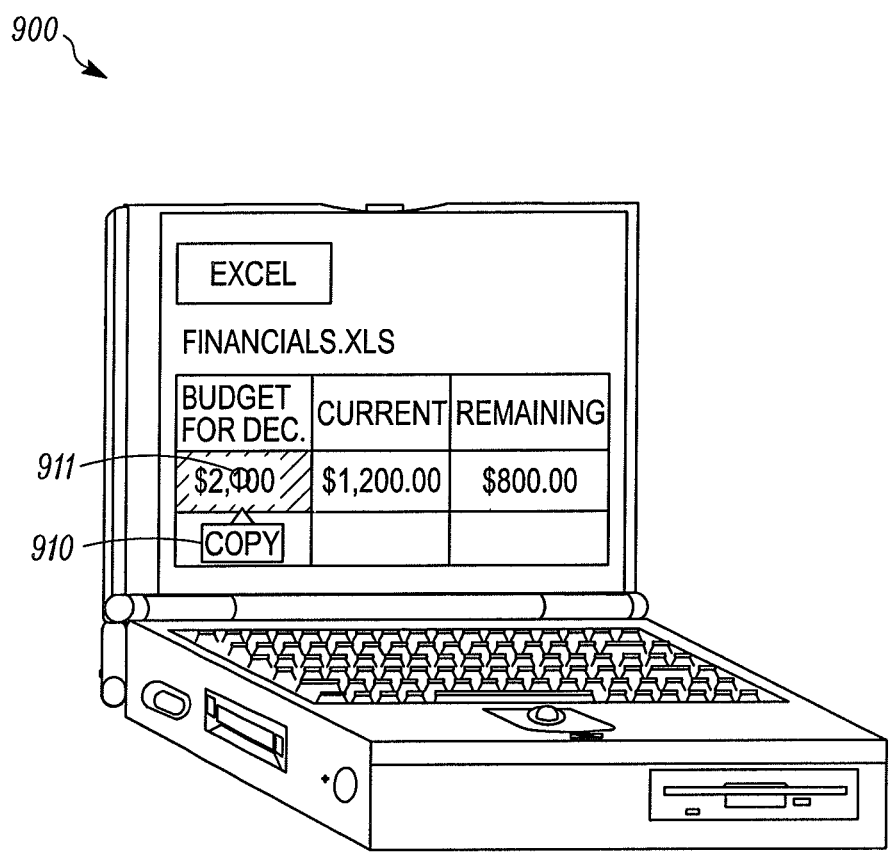
FIGS. 9-14 depict example interfaces associated with navigating among applications in accordance with some other embodiments.
Figure 9:
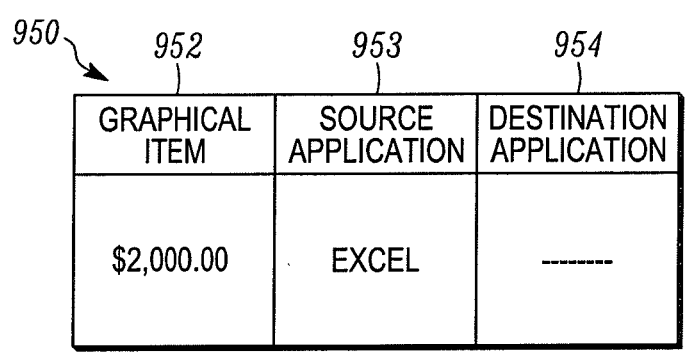

FIG. 9 depicts a graphical user interface 900 for the Microsoft® Excel application. In the depictions of FIGS. 9-16, the graphical user interfaces are embodied within a laptop computer. The example "Financials.xls" file as shown in FIG. 9 includes various spreadsheet data. The electronic device can detect a user selecting a graphical item 915 displayed within the interface 900. Further, the electronic device can display a copy option 910, for example in response to sensing a touch and hold event 911 initiated by the user and associated with the graphical item 915. FIG. 9 also depicts a data structure 950 that corresponds to the selections of and interactions with the interface 900. The data structure 950 can include a graphical item field 952, a sourceID field 953, and a destinationID field 954. According to embodiments, the electronic device can copy the graphical item 915 in response to the user selecting the copy option 910. More particularly, as shown in FIG. 9, the electronic device can write the graphical item 915 ("$2,000.00") to the graphical item field 952 and the application identification ("Excel") to the sourceID field 953. After the user selects the copy option 910, the electronic device can navigate to another application, such as via a manual user selection of a second application through menu system navigation, an icon or tab selection, a task manager, or an ALT+TAB sequence.

Figure 10:
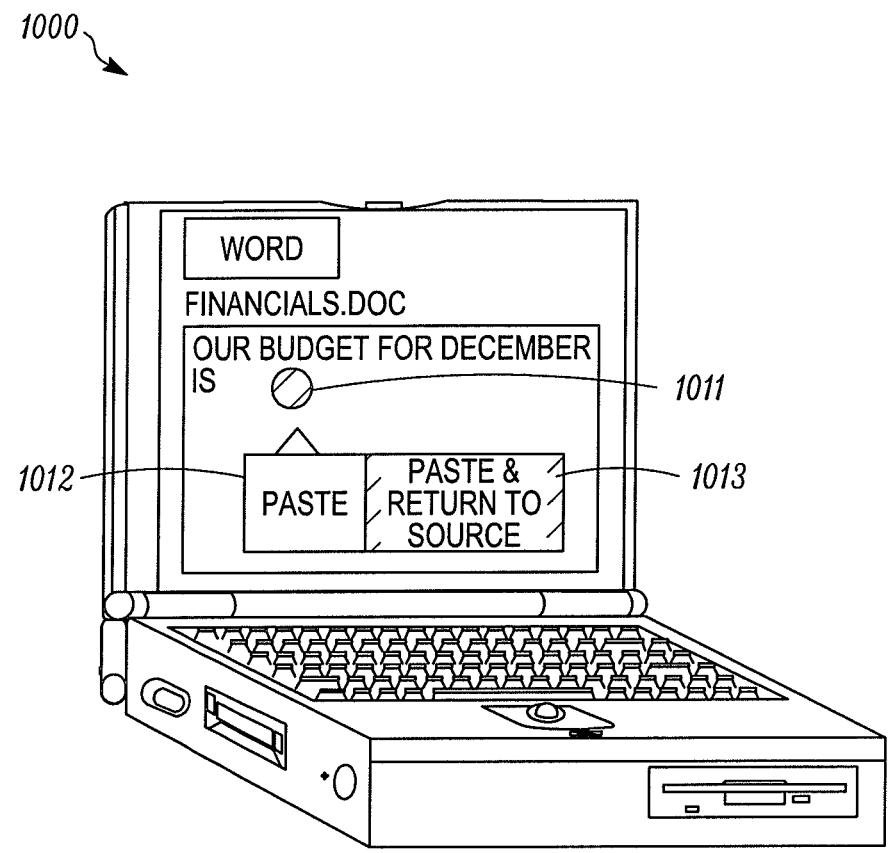

Referring to FIG. 10, the user navigates to the Word application and the electronic device can display an appropriate graphical user interface 1000. The interface 1000 as shown in FIG. 10 includes an editable document ("Financials.doc"). According to embodiments, the user of the electronic device can select to paste the graphical item 915 that the electronic device copied from the Excel application as depicted in FIG. 9. More particularly as shown in FIG. 10, the electronic device can sense a touch and hold event 1011 initiated by the user. According to embodiments, the electronic device can display a paste option 1012 and a paste and return option 1013 in response to detecting the touch and hold event 1011.

For purposes of explanation, the user selects the paste and return option 1013 in this example sequence. In response to detecting that the user selects the paste and return option 1013, the electronic device can paste the copied graphical item 915 and navigate to the Excel application as depicted in FIG. 9. In particular, the electronic device can access the data structure 950 to read the graphical item field 952 (which stores a copy of the graphical item 915), read the sourceID field 953 (which stores the identification of the Excel application), and write an identification of the Word application ("Word") to the destinationID field 954. As shown in FIG. 10, the destinationID field 954 can include a list having a capability of storing multiple records or entries for the destination identification. In embodiments, the electronic device can add the graphical item 915 to the interface 1000 at or near the location of the touch and hold event 1011, and can automatically navigate to the Excel application in accordance with the identification of the Excel application and the paste and return option 1013 instruction selected by the user.

Figure 11:
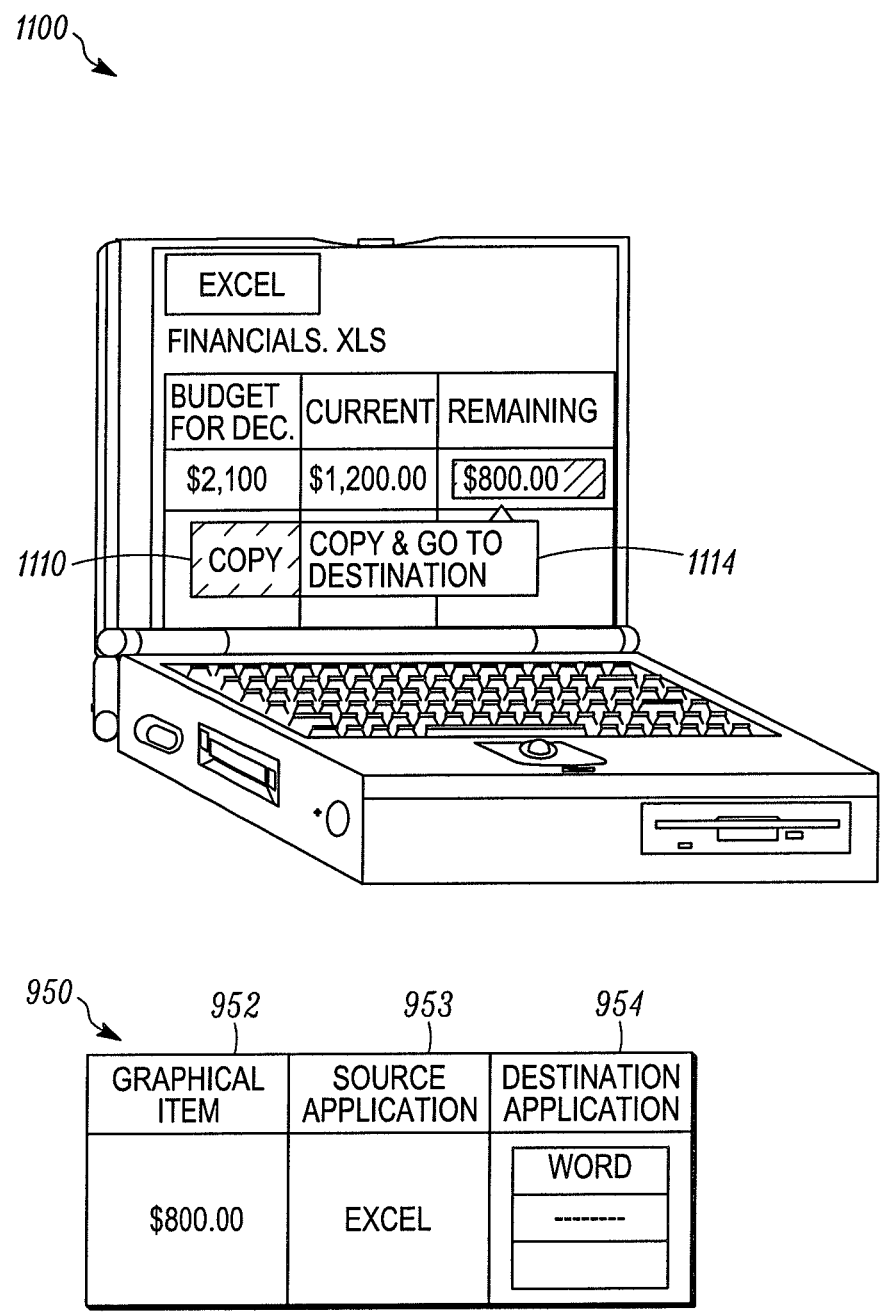

Referring to FIG. 11, the electronic device can automatically display an interface 1100 that corresponds to the Excel application after the user selects the paste and return option 1013. As shown in FIG. 11, the electronic device can detect or sense a user selecting a graphical item 1115 ("$800.00") (such as via a touch and hold event). According to embodiments, the electronic device can display a copy option 1110 and a copy and go to destination option 1114 in response to detecting the user selection. For purposes of explanation, the user selects the copy option 1110 in this example sequence. In response to detecting that the user selects the copy option 1110, the electronic device can overwrite the data of the data structure 950 with the graphical item 1115. Specifically, the electronic device can write "$800.00" to the graphical item field 952 (i.e., replace "$2,000.00" with "$800.00"). Also, the electronic device can write an application identifier ("Excel") to the sourceID field 953. Note that the destinationID field 954 is not erased to be null in this implementation but rather retains the existing destinationID data.

Figure 12:
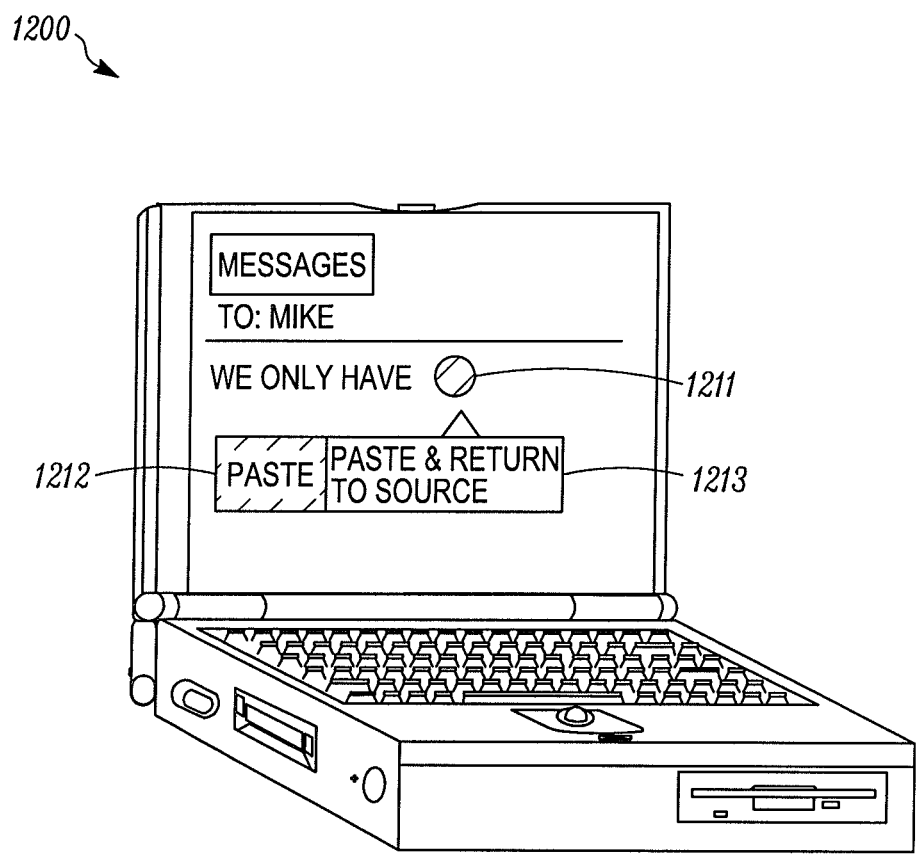

After the user selects the copy option 1110, the electronic device can navigate to another application, such as via detecting that the user manually launched a new application or changed focus to a second application. Referring to FIG. 12, the electronic device can display an interface 1200 corresponding to a Messages application. The interface 1200 as shown in FIG. 12 includes content associated with sending a message to an individual. According to embodiments, the user of the electronic device can select to paste the graphical item 1115 that the electronic device copied from the Excel application as depicted in FIG. 11. More particularly as shown in FIG. 12, the electronic device can sense a touch and hold event 1211 initiated by the user. According to embodiments, the electronic device can display a paste option 1212 and a paste and return option 1213 in response to detecting the touch and hold event 1211.

For purposes of explanation, the user selects the paste option 1212 in this example sequence. In response to detecting that the user selects the paste option 1212, the electronic device can paste the copied graphical item 1115. In particular, the electronic device can access the data structure 950 to read the graphical item field 952 (which stores a copy of the graphical item 1115) and write an identification of the Message application ("Messages") to the destinationID field. As shown in FIG. 12, the electronic device can add "Messages" to the list of destination identifications that already includes the "Word" identification as discussed with respect to FIG. 10. Alternately, the destinationID field 954 may allow only one cell of information and then the "Messages" identification would overwrite the existing "Word" identification. In embodiments, the electronic device can add the graphical item 1115 to the interface 1200 at or near the location of the touch and hold event 1211.

Figure 13:
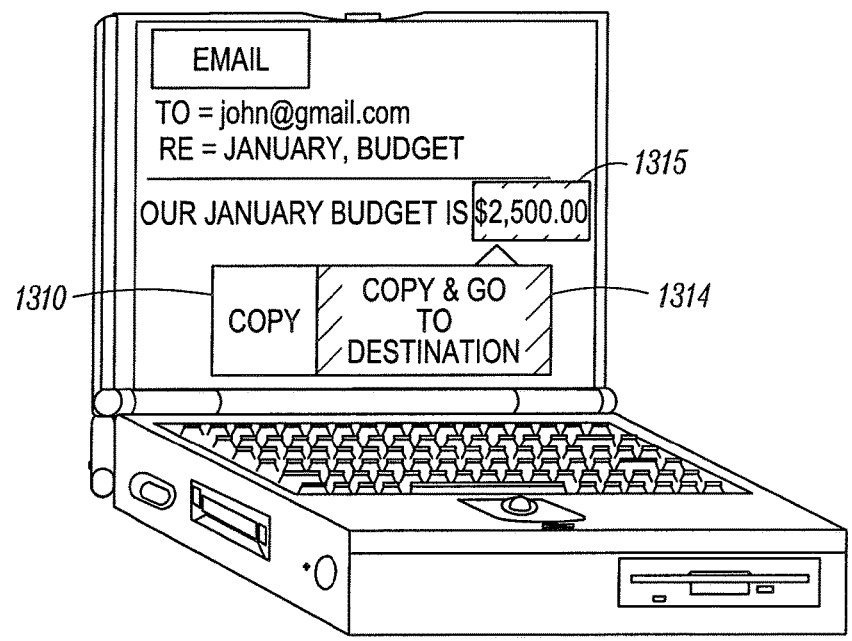

After the electronic device adds the graphical item 1115 to the interface 1200, the electronic device can navigate to another application such as via detecting that the user manually selects another application. Referring to FIG. 13, the electronic device can display an interface 1300 that corresponds to an Email application to which the electronic device navigates. As shown in FIG. 13, the electronic device can detect a user selecting a graphical item 1315 ("$2,500.00") (such as via a touch and hold event). According to embodiments, the electronic device can display a copy option 1310 and a copy and go to destination option 1314 in response to detecting the user selection.

For purposes of explanation, the user selects the copy and go to destination option 1314 in this example sequence. In response to detecting that the user selects the copy and go to destination option 1314, the electronic device can overwrite data in the data structure 950. Specifically, the electronic device can write the graphical item 1315 ("$2,500.00") to the graphical item field 952 (i.e., replace "$800.00" with "$2,500.00") and write an identification of the Email application ("Email") to the sourceID field 953 (i.e., replace "Excel" with "Email"). Further, the electronic device can examine the data structure 950 to determine an appropriate destination application. As shown in FIG. 13, the electronic device can read the destinationID field 954 to identify the Messages application as the appropriate destination application. More particularly, in the embodiment as shown in FIG. 13, the electronic device reads the destinationID field 954 of the data structure 950 to determine that the Messages application is the most recent application into which a graphical item has been pasted.

Figure 14:
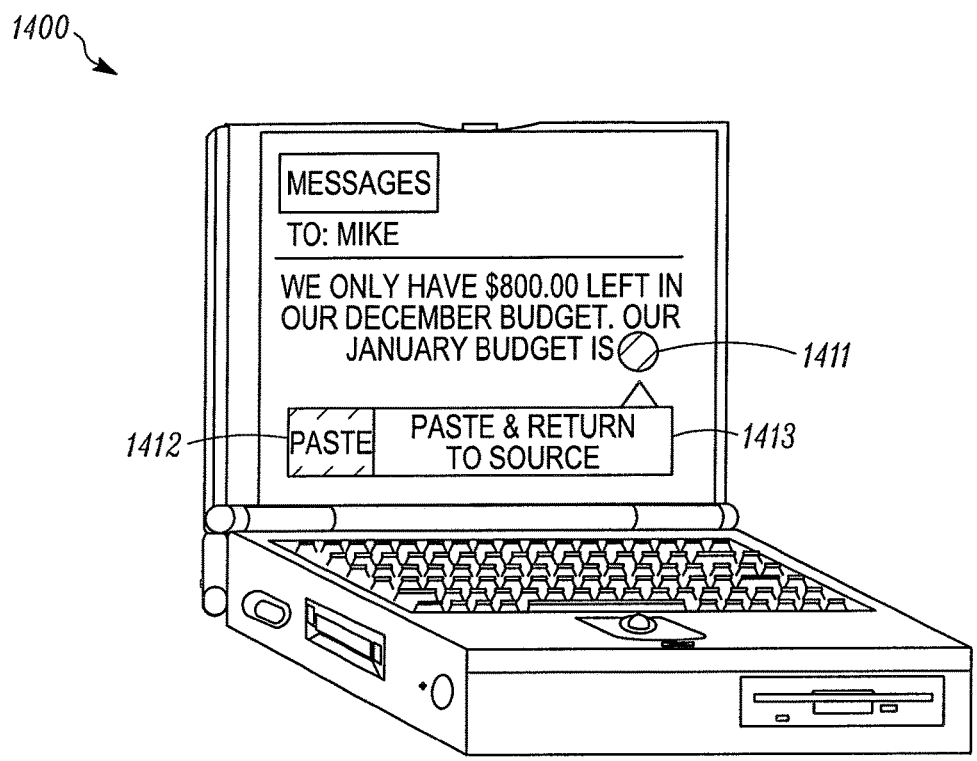

In response to identifying the Messages application in the destinationID field 954, the electronic device can automatically navigate to the Messages application. Referring to FIG. 14, the electronic device can display an interface 1400 corresponding to the Messages application. According to embodiments, the user of the electronic device can select to paste the graphical item 1315 that the electronic device copied from the Email application as depicted in FIG. 13. More particularly as shown in FIG. 14, the electronic device can sense a touch and hold event 1411 initiated by the user. According to embodiments, the electronic device can display a paste option 1412 and a paste and return option 1413 in response to detecting the touch and hold event 1411.

For purposes of explanation, the user selects the paste option 1412 in this example sequence. In response to detecting that the user selects the paste option 1412, the electronic device can paste the copied graphical item 1315. In particular, the electronic device can access the data structure 950 to read the graphical item field 952 (which stores a copy of the graphical item 1315). In embodiments, the electronic device can read the destinationID field 954 and determine that it already contains an identification of the Messages application ("Messages") at the bottom of the list. Accordingly, the electronic device need not write an identification of the Messages application to the data structure 950, although in some embodiments the same identification could be repeated. In embodiments, the electronic device can add the graphical item 1315 to the interface 1400 at or near the location of the touch and hold event 1411.

It should be appreciated that the systems and methods can delete, replace, or create the data structures and records thereof in response to various triggers, conditions, or the like. In some cases, the systems and methods can automatically clear the data structures and records thereof after the electronic device is rebooted, such as if the electronic device stores the data records in its RAM. Further, in cases in which the data structures allow a maximum amount of records, the electronic device can replace an old record with a new record if the data structure reaches its maximum capacity. It should be appreciated that other triggers and conditions are envisioned.

Figure 15A:
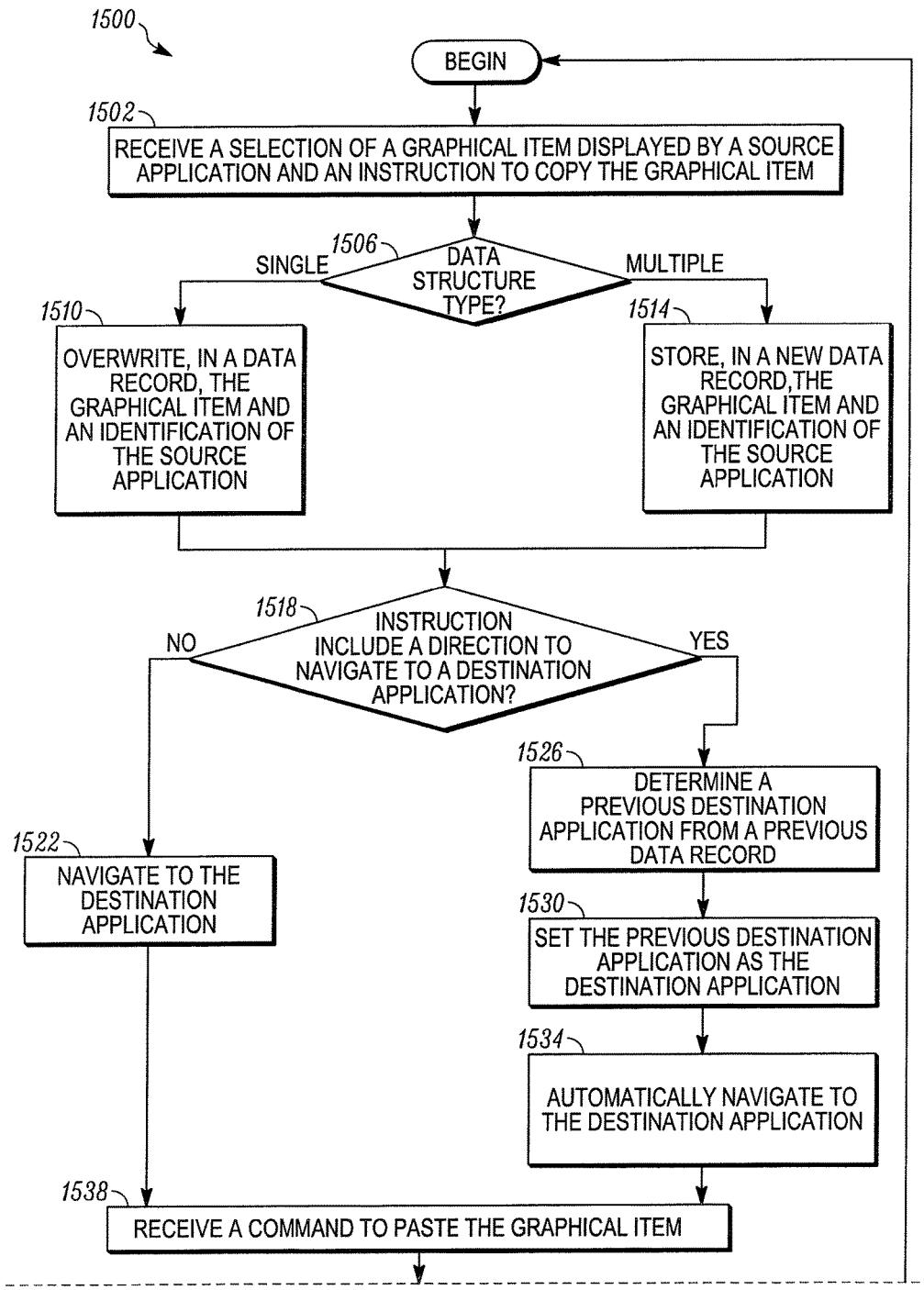
FIG. 15 depicts a flow diagram for navigating among applications in accordance with some embodiments.
Figure 15B:
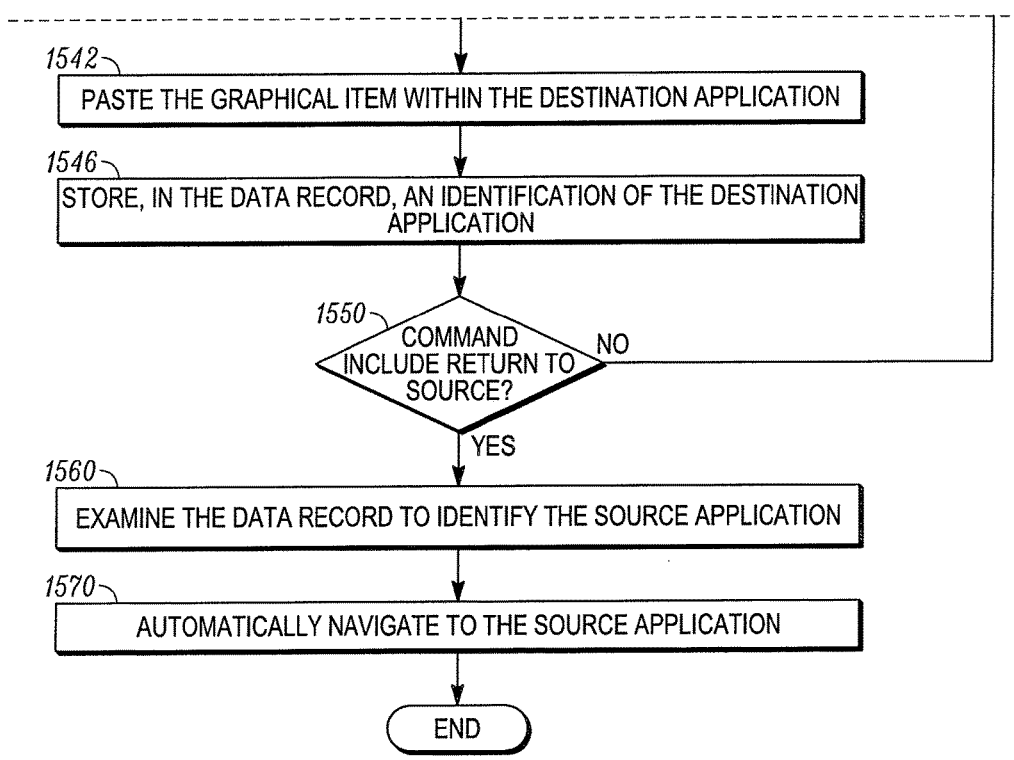

FIG. 15 is a flowchart of a method 1500 for an electronic device to manage navigation among applications installed on the electronic device. The method 1500 begins with the electronic device receiving 1502 a selection of a graphical item displayed by a source application and an instruction to copy the graphical item. The electronic device determines 1506 what type of data structure is associated with the instruction to copy the graphical item. If the data structure type is "SINGLE" (as explained with respect to FIGS. 9-14), the electronic device overwrites 1510, in a data record, a copy of the graphical item into a graphical item field and an identification of the source application into a sourceID field. In embodiments, the electronic device can create a new data record. If the data structure type is "MULTIPLE" (as explained with respect to FIGS. 1-8), the electronic device stores 1514, in a new data record, the graphical item and an identification of the source application. In particular, the electronic device can create a new data record that stores the graphical item in a graphical item field and the identification of the source application in a sourceID field.

The electronic device determines 1518 whether the copy instruction incorporates a direction to navigate to a destination application. In particular, the electronic device can determine if the user has selected a "copy and go to destination" option, or a similar option. If the instruction does not include a direction to navigate to a destination application ("NO"), the electronic device navigates 1522 to the destination application under the user's direction. In embodiments, the electronic device can receive a manual user selection of the destination application. If the instruction does include a direction to navigate to a destination application ("YES"), the electronic device determines 1526 a previous destination application from a previous data record entry. In some cases, the electronic device can examine the previous data record to identify a previous destination application into which a graphical item was pasted (as explained with respect to FIG. 3). In other cases, the electronic device can examine a singular data record to identify a previous destination application into which a graphical item was pasted (as explained with respect to FIG. 13). The electronic device sets 1530 the previous destination application as the destination application. In particular, the electronic device can store an identification of the previous destination application in an appropriate destinationID field of a record of a singular or multiple data structure. The electronic device automatically navigates 1534 to the destination application.

Following the respective manual or automatic navigation (1522 or 1534), the electronic device receives 1538 a command to paste the graphical item. For example, the electronic device can detect a touch and hold event followed by a selection to paste the graphical item. The electronic device pastes 1542 the graphical item within the destination application. In embodiments, the electronic device can examine the appropriate data record to read the graphical item, and then add the graphical item to a graphical user interface of the destination application. The electronic device stores 1546, in the data record, an identification of the destination application. In some embodiments in which a singular data structure is used, the electronic device writes the identification of the destination application to the data record in a destinationID field. In some embodiments in which a multiple data structure is used, the electronic device creates a new data record and writes the identification of the destination application to a destinationID field of the new data record created in step 1514.

The electronic device determines 1550 if the paste command incorporates a direction to return to the source application. In particular, the electronic device can determine if the user has selected a "paste and return" option, or a similar option. If the instruction does not include a direction to return to the source application ("NO"), then processing can return to the beginning (or any previous step), or end. If the instruction does include a direction to return to the source application ("YES"), the electronic device examines 1560 the data record (or the new data record) to identify the source application from a sourceID field. Responsive to identifying the source application, the electronic device automatically navigates 1570 to the source application.

Figure 16:
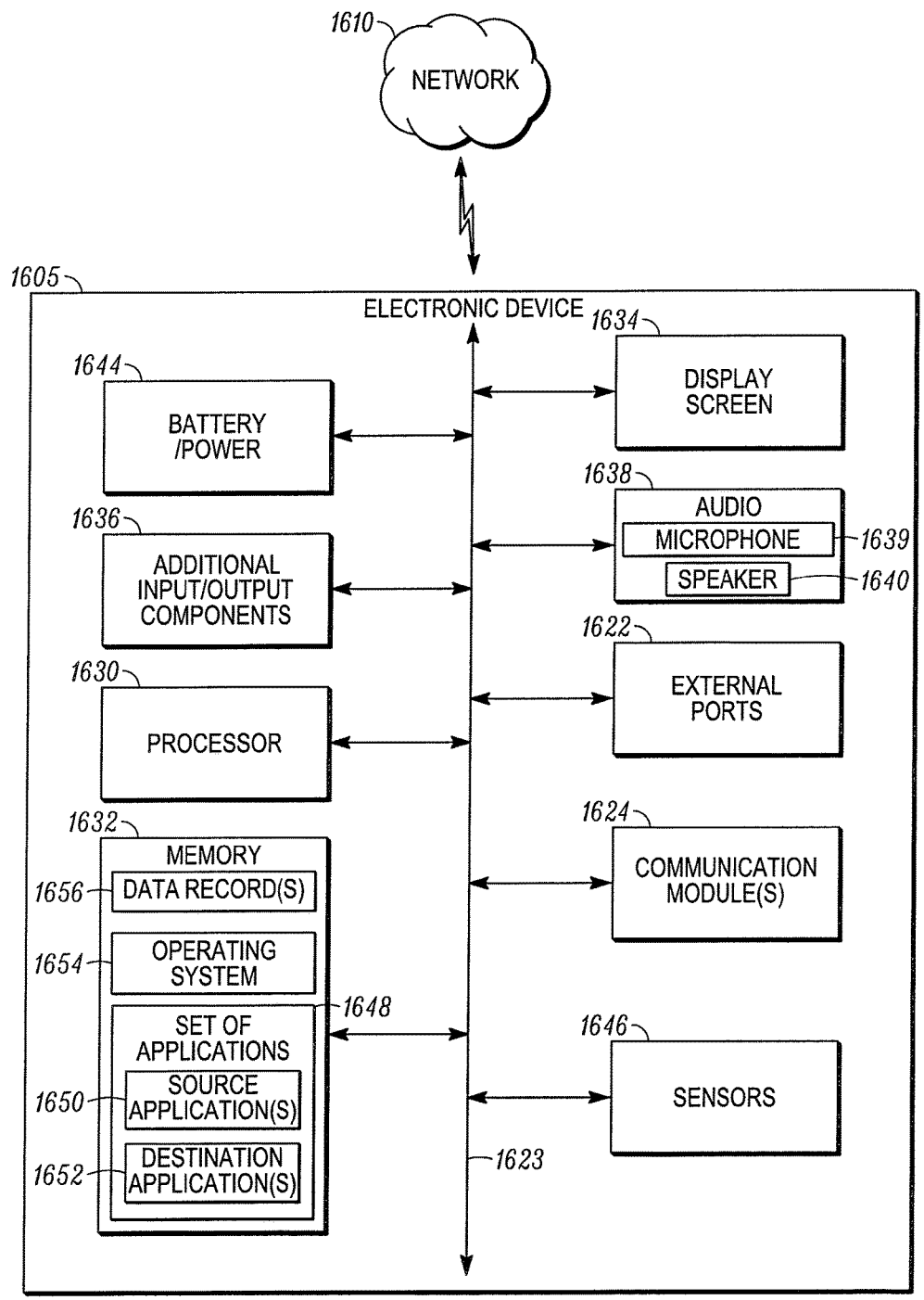
FIG. 16 is a block diagram of an electronic device in accordance with some embodiments.

FIG. 16 illustrates an example electronic device 1605 in which the aspects may be implemented. As shown previously, the electronic device may be implemented as a smartphone or a laptop computer. Alternately, the electronic device may be other types of mobile computing device or other types of electronic devices such as a desktop computer, personal digital assistant, internet television, gaming console, or the like. The electronic device 1605 can include a processor 1630, a memory 1632 (e.g., hard drives, flash memory, MicroSD cards, and others), a power module 1644 (e.g., batteries, wired or wireless charging circuits, etc.), and one or more external ports 1622 (e.g., cellular input and output, Universal Serial Bus (USB), HDMI, IEEE 1394, and/or others), each configured to communicate via a communication bus 1623. The processor 1630 can interface with the memory 1632 to execute a set of applications 1648 such as one or more source applications 1650 and one or more destination applications 1652. The processor 1630 can interface with the memory to execute an operating system 1654 capable of facilitating the functionalities as discussed herein. As shown in FIG. 16, the memory can store data records 1656 or structures that include appropriate data fields utilized by the electronic device 1605 to facilitate the systems and methods as discussed herein.

The electronic device 1605 can further include a communication module 1624 configured to interface with the one or more external ports 1622 to communicate data via one or more networks 1610. For example, the communication module 1624 can include one or more transceivers functioning in accordance with IEEE standards, 3GPP standards, or other standards, and configured to receive and transmit data via the one or more external ports 1622. More particularly, the communication module 1624 can include one or more WWAN transceivers configured to communicate with a wide area network including one or more cell sites or base stations to communicatively connect the electronic device 1605 to additional devices or components. Further, the communication module 1624 can include one or more WLAN and/or WPAN transceivers configured to connect the electronic device 1605 to local area networks and/or personal area networks, such as a Bluetooth® network.

The electronic device 1605 can further include one or more sensors 1646 such as, for example, imaging sensors, accelerometers, and other sensors. The electronic device 1605 can include an audio module 1638 including hardware components such as a speaker 1640 for outputting audio and a microphone 1639 for receiving audio. The electronic device 1605 may further include one or more display screen 1634, and additional I/O components 1636 (e.g., capacitive or resistive touch sensitive input panels, keys, buttons, lights, LEDs, cursor control devices, haptic devices, and others). The display screen 1634 and the additional I/O components 1636 may be considered to form portions of a user interface (e.g., portions of the electronic device 1605 associated with presenting information to the user and/or receiving inputs from the user).

In embodiments, the display screen 1634 is a touchscreen display using singular or combinations of display technologies such as electrophoretic displays, electronic paper, polyLED displays, OLED displays, AMOLED displays, liquid crystal displays, electrowetting displays, rotating ball displays, segmented displays, direct drive displays, passive-matrix displays, active-matrix displays, and/or others. Further, the display screen 1634 can include a thin, transparent touch sensor component superimposed upon a display section that is viewable by a user. For example, such displays include capacitive displays, resistive displays, surface acoustic wave (SAW) displays, optical imaging displays, and the like.

In general, a computer program product in accordance with an embodiment includes a computer usable storage medium (e.g., standard random access memory (RAM), an optical disc, a universal serial bus (USB) drive, or the like) having computer-readable program code embodied therein, wherein the computer-readable program code is adapted to be executed by the processor 1630 (e.g., working in connection with an operating system) to implement a user interface method as described below. In this regard, the program code may be implemented in any desired language, and may be implemented as machine code, assembly code, byte code, interpretable source code or the like (e.g., via C, C++, Java, Actionscript, Objective-C, Javascript, CSS, XML, and/or others).

Thus, it should be clear from the preceding disclosure that the systems and methods offer improved application navigation techniques. The systems and methods advantageously enable electronic devices to automatically navigate among applications via user-selected copy and/or paste options. The systems and methods improve the user experience by reducing the amount of necessary user interactions with electronic devices to navigate among applications.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

What is claimed is:

1. A method comprising:

receiving, by a computing device, an indication of a first user input selecting a graphical item included in a first graphical user interface associated with a source application and a second user input indicating a command to copy the graphical item and output a second graphical user interface associated with a destination application;

storing, by the computing device, in a data record of a data structure, an indication of the graphical item and an indication of the source application, wherein the data structure includes a plurality of other data records that indicate a plurality of graphical items, a plurality of source applications, and a plurality of destination applications;

determining, by the computing device, based on the plurality of data records, a most frequently selected destination application of the plurality of destination applications;

setting, by the computing device, the most frequently selected destination application selected as the destination application;

outputting, by the computing device and for display, the second graphical user interface associated with the destination application;

receiving, by the computing device, a third user input indicative of a command to paste the graphical item and automatically return to the first source application; and responsive to receiving the third user input:
 outputting, by the computing device and for display, a third graphical user interface associated with the destination application, the third graphical user interface including the graphical item; and
 automatically outputting, by the computing device and for display, a fourth graphical user interface associated with the source application.

2. The method of claim 1, further comprising:
appending, to the data record, an indication of the destination application.

3. The method of claim 1, wherein the source application is a first source application, the method further comprising:
 receiving, by the computing device, an indication of a fourth user input selecting an additional graphical item included in a fifth graphical user interface associated with a second source application and an indication of a fifth user input indicating a command to copy the additional graphical item and automatically output a sixth graphical user interface associated with to the destination application;
 responsive to receiving the fifth user input:
  overwriting, by the computing device, in the data record, the indication of the graphical item with an indication of the additional graphical item, and the indication of the first source application with an indication of the second source application; and
  automatically outputting, by the computing device and for display, the sixth graphical user interface associated with the destination application.

4. The method of claim 3, wherein the second source application is the first source application.

5. The method of claim 3, wherein the receiving the indication of the fourth user input selecting the additional graphical item comprises:
 receiving, by the computing device, an indication of user input selecting the second source application.

6. The method of claim 1, wherein the destination application is a first destination application, the method further comprising:

outputting, by the computing device and for display, a fifth graphical user interface associated with a second destination application;

receiving, by the computing device, a fourth user input indicative of a second command to paste the graphical item and automatically return to the source application; and responsive to receiving the fourth user input:
 outputting, by the computing device and for display, a sixth graphical user interface associated with the second destination application, the sixth graphical user interface including the graphical item;
 appending, by the computing device, to the data record, an indication of the second destination application; and
 automatically outputting, by the computing device and for display, a seventh graphical user interface associated with the source application.

7. The method of claim 1, wherein the source application is a first source application, and wherein the data record is a first data record, the method further comprising:
 receiving, by the computing device, an indication of a fourth user input selecting an additional graphical item included in a fifth graphical user interface associated with a second source application and a fifth user input indicating a command to copy the additional graphical item; and
 responsive to receiving the fifth user input:
  storing, by the computing device, in a second data record of the data structure, an indication of the additional graphical item and an indication of the second source application.

8. The method of claim 7, wherein the indication of the command to copy the additional graphical item includes an indication of a command to automatically output a sixth graphical user interface associated with the destination application, and wherein the method further comprises:
 automatically outputting, by the computing device and for display, the sixth graphical user interface associated with the destination application.

9. An electronic device comprising:
at least one processor; and
a memory comprising instructions that, when executed by the at least one processor, cause the at least one processor to:
 receive an indication of a first user input selecting a graphical item included in a first graphical user interface associated with a source application and a second user input instructing the computing device to copy the graphical item and output a second graphical user interface associated with a destination application;
 store, in a data record of a data structure an indication of the graphical item and information identifying the source application, wherein the data structure includes a plurality of other data records that indicate a plurality of graphical items, a plurality of source applications, and a plurality of destination applications;
 determine, based on the plurality of data records, a most frequently selected destination application of the plurality of destination applications;
 set the most frequently selected destination application as the destination application;
 output, for display, the second graphical user interface associated with the destination application;

receive a second third input indicative of a command to paste the graphical item and automatically return to the source application;

responsive to receiving the third user input:

output, for display, a third graphical user interface associated with the destination application, the third graphical user interface including the graphical item; and automatically output, for display, a fourth graphical user interface associated with the source application.

10. The electronic device of claim 9, wherein execution of the instructions further cause the at least one processor to:

append an indication of the destination application to the data record.

11. The electronic device of claim 9, wherein the source application is a first source application, and wherein execution of the instructions further cause the at least one processor to:

receive an indication of a fourth user input selecting an additional graphical item included in a fifth graphical user interface associated with a second source application and an indication of a fifth user input indicating a command to copy the additional graphical item and automatically output a sixth graphical user interface associated with the destination application;

overwrite the indication of the graphical item with an indication of the additional graphical item and the indication of the first source application with an indication of the second source application; and automatically output, for display, the sixth graphical user interface associated with the destination application.

12. The electronic device of claim 11, wherein the second source application is the first source application.

13. The electronic device of claim 11, wherein the instructions cause the at least one processor to receive the indication of the fourth user input by at least causing the at least one processor to:

receive an indication of user input selecting the second source application.

14. The electronic device of claim 9, wherein the destination application is a first destination application, and wherein execution of the instructions further cause the at least one processor to:

output, for display, a fifth graphical user interface associated with a second destination application, receive a fourth user input indicative of a second command to paste the graphical item and automatically return to the source application, and responsive to receiving the fourth user input:

outputting, by the computing device and for display, a sixth graphical user interface associated with the second destination application, the sixth graphical user interface including the graphical item;

store an indication of the second destination application to the data record; and automatically output, for display, a seventh graphical user interface associated with the source application.

15. The electronic device of claim 14, wherein the instructions cause the at least one processor to store the indication of the second destination application to the data record by at least causing the at least one processor to:

create a new data record in the data structure; and store, in the new data record, an indication of the second destination application.

* * * * *